(12) United States Patent
van den Broek

(10) Patent No.: US 9,244,990 B2
(45) Date of Patent: Jan. 26, 2016

(54) REPRESENTATION OF DATA RECORDS IN GRAPHIC TABLES

(75) Inventor: Hendrik van den Broek, Lexington, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 509 days.

(21) Appl. No.: 13/269,192

(22) Filed: Oct. 7, 2011

(65) Prior Publication Data

US 2013/0091412 A1   Apr. 11, 2013

(51) Int. Cl.
*G06F 17/30* (2006.01)

(52) U.S. Cl.
CPC .... *G06F 17/30572* (2013.01); *G06F 17/30592* (2013.01)

(58) Field of Classification Search
CPC ............... G06F 17/246; G06F 17/245; G06F 17/30592; G06F 17/30572
USPC .................... 715/227, 212; 707/769, 607, 600
See application file for complete search history.

(56) References Cited

U.S. PATENT DOCUMENTS

| | | | | |
|---|---|---|---|---|
| 6,298,342 B1 * | 10/2001 | Graefe | ............. | G06F 17/30595 707/602 |
| 6,411,313 B1 * | 6/2002 | Conlon | ................ | G06F 17/246 715/202 |
| 6,626,959 B1 * | 9/2003 | Moise | ................... | G06F 17/246 715/210 |
| 6,707,454 B1 * | 3/2004 | Barg | ..................... | G06F 17/246 345/440 |
| 6,750,864 B1 * | 6/2004 | Anwar | ............. | G06F 17/30489 345/440 |
| 7,024,639 B2 * | 4/2006 | Teig | .................... | G06F 17/5045 709/223 |
| 7,058,621 B1 * | 6/2006 | Wolge | .............. | G06F 17/30595 |
| 7,143,339 B2 * | 11/2006 | Weinberg | ............. | G06F 17/243 707/E17.006 |
| 7,818,661 B2 * | 10/2010 | Patel | ............................. | 715/212 |
| 8,121,975 B2 * | 2/2012 | Averbuch | .......... | G06F 17/30592 707/600 |
| 8,127,223 B2 * | 2/2012 | Becerra et al. | ................ | 715/212 |
| 8,185,817 B2 * | 5/2012 | Collie | ................... | G06F 17/246 715/219 |
| 8,719,725 B2 * | 5/2014 | Workman et al. | ............. | 715/781 |
| 2002/0087510 A1 * | 7/2002 | Weinberg | ............. | G06F 17/243 |
| 2002/0116417 A1 * | 8/2002 | Weinberg | ............. | G06F 17/243 715/212 |
| 2003/0154210 A1 * | 8/2003 | Teig | ...................... | G06F 17/509 |
| 2003/0159116 A1 * | 8/2003 | Teig | .................... | G06F 17/5045 709/223 |
| 2003/0217026 A1 * | 11/2003 | Teig | .................... | G06F 17/5045 |
| 2006/0031187 A1 * | 2/2006 | Pyrce | ................ | G06F 3/04815 |
| 2006/0061589 A1 * | 3/2006 | Suyama et al. | ............... | 345/606 |
| 2006/0074991 A1 * | 4/2006 | Lussier | ................. | A61K 31/63 |
| 2007/0130207 A1 * | 6/2007 | Pate | ....................... | G06Q 30/02 |
| 2007/0260578 A1 * | 11/2007 | Ghosh | .............................. | 707/2 |
| 2009/0012928 A1 * | 1/2009 | Lussier | ............... | G06F 17/2735 706/59 |
| 2009/0187815 A1 * | 7/2009 | Becerra et al. | ................ | 715/212 |
| 2009/0210430 A1 * | 8/2009 | Averbuch | .......... | G06F 17/30592 |
| 2009/0319880 A1 * | 12/2009 | Collie | ................... | G06F 17/246 715/219 |
| 2009/0327851 A1 * | 12/2009 | Raposo | ............. | G06F 17/30289 715/213 |
| 2012/0159297 A1 * | 6/2012 | Peters | .......................... | 715/212 |
| 2012/0265762 A1 * | 10/2012 | Wade | .................... | G06Q 50/184 707/741 |
| 2013/0024803 A1 * | 1/2013 | Workman et al. | ............. | 715/781 |

* cited by examiner

*Primary Examiner* — Sheree Brown
(74) *Attorney, Agent, or Firm* — Kilpatrick Townsend & Stockton, LLP

(57) ABSTRACT

Various arrangements for creating a pivot table are presented. A set of stored records may be accessed. A plurality of stored records from the set of stored records may be selected to be represented in a plurality of cells of the pivot table. A graphical representation may be generated for display for each stored record of the plurality of stored records. Each graphical representation may be generated for display within a cell of the plurality of cells of the pivot table. Each graphical representation of the pivot table is actively linked with the corresponding stored record.

16 Claims, 10 Drawing Sheets

REPRESENTATION OF DATA RECORDS IN GRAPHIC TABLES

BACKGROUND

Pivot tables may be an effective data presentation mechanism to summarize data. A pivot table may be used to perform functions such as sort, count, total, and/or average data present in another data structure, such as a database. A pivot table may be used to sort and sum elements (e.g., records) independent of the original data layout in the database. As an example, a database may have a stored record for each employee of a company. Within each employee's record, a city where the employee is based and a department of the company in which the employee is employed may be indicated. A pivot table may be created based on cities and departments, such that a number is displayed for each city and department combination. For example, a pivot table having a cell representing the combination of "Boston" and "Finance" may display the number "3" to indicate that three employees of the Finance department are based in Boston.

While such pivot tables may provide a useful summarization of data, it may be inefficient to interact with the data used to create the pivot table. For example, accessing the database entry for the employees who work in the finance department and are based in Boston may not be possible directly from the pivot table. Rather, a separate table may need to be displayed that indicates the three records referred to by the number 3.

SUMMARY

Various arrangements for creating pivot tables are presented. In some embodiments, a method for creating a pivot table are presented. The method may include accessing, by a computer system, a set of stored records. The method may include determining, by the computer system, a plurality of stored records from the set of stored records to be represented in a plurality of cells of the pivot table. The method may include generating, by the computer system, for display, the pivot table that comprises a graphical representation for each stored record of the plurality of stored records. Each graphical representation may be generated for display within the plurality of cells of the pivot table. Each graphical representation of the pivot table may be actively linked with a corresponding stored record.

Such a method may include one or more of the following: The method may include receiving, by the computer system, input selecting a graphical representation displayed within the pivot table. The method may include accessing, by the computer system, the stored record that is actively linked to the graphical representation. The method may include outputting, by the computer system, for display, data from the stored record. The method may include calculating, by the computer system, a number of stacks for use in each cell that comprises graphical representations. Calculating the number of stacks for use in each cell of the pivot table that comprises graphical representations may comprise determining, by the computer system, a maximum number of graphical representations to be displayed in a single cell of the plurality of cells of the pivot table; determining, by the computer system, a cell height and a cell width of the each cell of the plurality of cells; and calculating, by the computer system, the number of stacks for use in each cell of the pivot table using the cell height, the cell width, and the maximum number of graphical representations in the single cell. Each cell of the pivot table that comprises graphical representations may have a same number of stacks. The method may include calculating, by the computer system, dimensions of each graphical representation using the cell width and the number of stacks, wherein each graphical representation of the pivot table has the dimensions. The method may include arranging, by the computer system, graphical representations within at least one cell of the plurality of cells such that the at least one cell displays a graphical bar comprising the cell's graphical representations. The method may include assigning, by the computer system, a color to each graphical representation based on a property of the stored record that is actively linked to the graphical representation. Generating for display the graphical representation for each stored record may comprise using the assigned color. The method may include receiving, by the computer system, input selecting a selected graphical representation displayed within the pivot table, wherein the selected graphical representation is within a first cell of the plurality of cells of the pivot table. The method may include receiving, by the computer system, input selecting a second cell of the plurality of cells. The method may include moving, by the computer system, the selected graphical representation from the first cell of the pivot table to the second cell of the pivot table. The method may include modifying, by the computer system, the stored record actively linked to the selected graphical representation such that the stored record matches one or more characteristics of the second cell. Receiving input selecting the selected graphical representation displayed within the pivot table and receiving input selecting the second cell of the plurality of cells may comprise receiving, by the computer system, input dragging the selected graphical representation from the first cell to the second cell.

In some embodiments, a computer program product residing on a non-transitory processor-readable medium for creating a pivot table may be presented. The computer program product may comprise computer-readable instructions configured to cause a computer to access a set of stored records. The computer program product may also comprise computer-readable instructions configured to cause the computer to determine a plurality of stored records from the set of stored records to be represented in a plurality of cells of the pivot table. The computer program product may also comprise computer-readable instructions configured to cause the computer to generate for display, the pivot table that comprises a graphical representation for each stored record of the plurality of stored records. Each graphical representation may be generated for display within a cell of the plurality of cells of the pivot table. Each graphical representation of the pivot table may be actively linked with the corresponding stored record. The computer program product may also comprise computer-readable instructions configured to cause the computer to receive input selecting a graphical representation displayed within the pivot table. The computer program product may also comprise computer-readable instructions configured to cause the computer to access the stored record that is actively linked to the graphical representation. The computer program product may also comprise computer-readable instructions configured to cause the computer to output for display data of the stored record.

Embodiments of such a computer program product may include one or more of the following: Computer-readable instructions configured to cause the computer to calculate a number of stacks for use in each cell that comprises graphical representations. The computer-readable instructions configured to cause the computer to calculate the number of stacks for use in each cell of the pivot table that comprises graphical representations may comprise computer-readable instructions configured to cause the computer to: determine a maximum number of graphical representations to be displayed in a single cell of the plurality of cells of the pivot table; determine a cell height and a cell width of each cell of the plurality of cells; and calculate the number of stacks for use in each cell of the pivot table using the cell height, the cell width, and the maximum number of graphical representations in the single cell. The computer program product further comprises computer-readable instructions configured to cause the computer to calculate dimensions of each graphical representation using the cell width and the number of stacks, wherein each graphical representation in the pivot table has the dimensions. The computer program product may further comprise computer-readable instructions configured to cause the computer to arrange graphical representations within at least one cell of the plurality of cells such that the at least one cell displays a graphical bar comprising the cell's graphical representations. The computer program product may further comprise computer-readable instructions configured to cause the computer to assign a color to each graphical representation based on a property of the stored record that is actively linked to the graphical representation. The computer-readable instructions configured to cause the computer to generate for display the graphical representation for each stored record may comprise computer-readable instructions to cause the computer to use the assigned color. The computer program product may further comprise computer-readable instructions configured to cause the computer to: receive input selecting a second cell of the plurality of cells, wherein the graphical representation is located in a first cell of the pivot table; move the graphical representation from the first cell of the pivot table to the second cell of the pivot table; and modify the stored record actively linked to the graphical representation such that the stored record matches one or more characteristics of the second cell. The computer program product may further comprise computer-readable instructions configured to cause the computer to: receive input that indicates to delete the graphical representation; delete the graphical representation from the pivot table; and delete the stored record actively linked with the graphical representation.

In some embodiments, a system for creating a pivot table is presented. The system may include a computer system comprising a processor; and a memory communicatively coupled with and readable by the processor and having stored therein processor-readable instructions. The instructions, when executed by the processor, may cause the processor to access a set of stored records. The instructions, when executed by the processor, may cause the processor to determine a plurality of stored records from the set of stored records to be represented in a plurality of cells of the pivot table. The instructions, when executed by the processor, cause the processor t determine a maximum number of graphical representations to be displayed in a single cell of the plurality of cells of the pivot table. The instructions, when executed by the processor, cause the processor to determine a cell height and a cell width of the each cell of the plurality of cells. The instructions, when executed by the processor, cause the processor to calculate a number of stacks for use in each cell of the pivot table using the cell height, the cell width, and the maximum number of graphical representations in the single cell. The instructions, when executed by the processor, cause the processor to calculate dimensions of each graphical representation using the cell width and the number of stacks, wherein each graphical representation for each stored record has the dimensions. The instructions, when executed by the processor, cause the processor to generate for display the pivot table that comprises a graphical representation for each stored record of the plurality of stored records. Each graphical representation may be generated for display within a cell of the plurality of cells of the pivot table. Each graphical representation of the pivot table may be actively linked with a corresponding stored record. The instructions, when executed by the processor, cause the processor to receive input selecting the graphical representation displayed within the pivot table. The instructions, when executed by the processor, cause the processor to access the stored record that is actively linked to the graphical representation. The instructions, when executed by the processor, cause the processor to output for display data from the stored record. The instructions, when executed by the processor, cause the processor to assign a color to each graphical representation of the pivot table based on a property of the stored record that is actively linked to the graphical representation.

DETAILED DESCRIPTION

Figure 1:
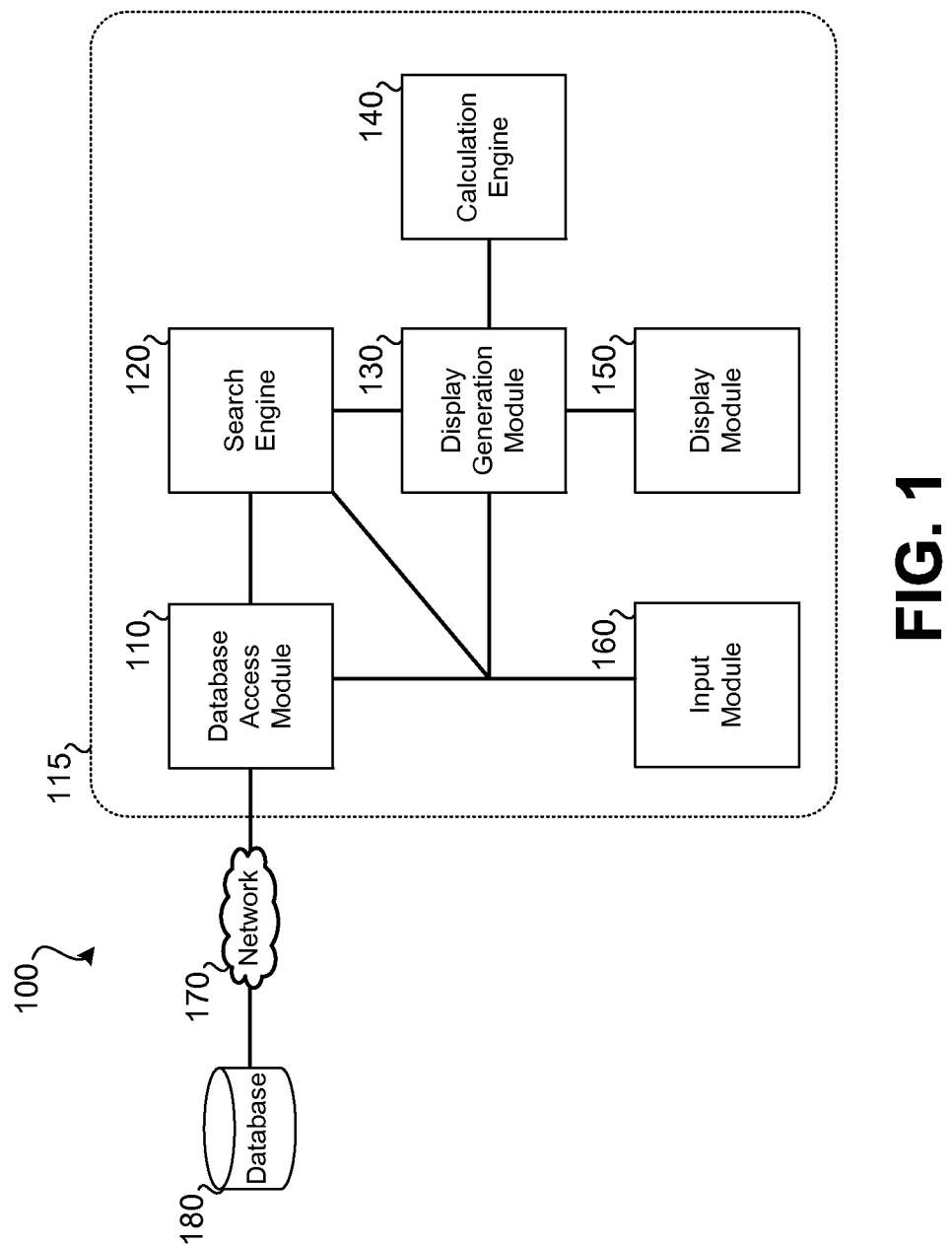
FIG. 1 illustrates a block diagram of an embodiment of a system configured to create a pivot table actively linked to stored data elements.

While conventional pivot tables may display a number to indicate a quantity of stored records that fall into one or more categories of the pivot table (which may be represented as cells), such a display of a number may not permit fast access to the stored records upon which the pivot table is based. Rather than displaying a number (or any alphanumeric string) in the cells of a pivot table, a (non-alphanumeric) graphical representation for each stored record included in a particular cell may be displayed. As such, if a cell of a pivot table is associated with five stored records, five graphical representations, such as five squares, may be present within the cell. Each of these graphical representations may correspond to a particular stored record.

Each graphical representation may be "actively linked" with a stored record. A user may provide input that allows for viewing and/or modifying of stored records actively linked with the graphical representations present in a pivot table. For example, by moving a cursor over a particular graphical representation or by clicking on a particular graphical representation, the user may be able to view some or all of the data of the actively linked stored record. As such, manipulation of a graphical representation present in a pivot chart is tied to a specific stored record.

In order for a user to compare the quantity of records that are present in various cells of a pivot table, graphical representations present in each cell may be organized such that a visual inspection of the cells allows for a comparison of quantity. As such, each graphical representation used in a pivot table may have the same dimensions. Further, the arrangement of graphical representations within each cell may be kept similar across all cells of a pivot table. For example, each cell may have the same number of columns of graphical representations. The number of columns (also referred to as stacks) that may be used for each cell of a pivot table may be calculated based on cell height, cell width, and the maximum number of graphical representations being present in a single cell of the pivot table. The dimensions of the graphical representations may also be calculated. Graphical representations within a cell may be arranged such that the collective graphical representations in each cell form a bar. Such a bar may allow for efficient visual comparison by a user of the quantities of graphical representations in different cells.

A pivot table having graphical representations of individual stored records may allow for the pivot table to be used to edit the stored records. In some embodiments, when input is received (such as from a user) that selects a graphical representation, data from the actively linked stored record may be displayed. The user may be permitted to edit some or all of this data. Modifications may be used to update the actively linked stored record. Additionally, a user may be permitted to move a graphical representation from a first cell to a second cell, such as by dragging the graphical representation from the first cell to the second cell. By moving a graphical representation to a different cell, the stored record actively linked with the graphical representation may be updated in accordance with the characteristics of the second cell. For example, referring to the previous example, if a first cell is associated with "Boston" and "Finance," and a second cell is associated with "Denver" and "Finance," moving the graphical representation to the second cell may result in the stored record that is actively linked with the graphical representation being modified. In this example, the employee's home city would be changed to Denver in the actively linked stored record.

Various properties of the graphical representations may be varied in order to display more information to a user via the pivot table. The color of a graphical representation may vary in accordance with a characteristic of the actively linked stored record. For example, if each stored record relates to an employee and indicates the employee's gender, graphical representations linked with stored records of male employees may be blue, while graphical representations linked with stored records of female employees may be red.

FIG. 1 illustrates a block diagram of an embodiment of a system 100 configured to create a pivot table actively linked to stored data elements. System 100 may include the following components: database access module 110, search engine 120, display generation module 130, calculation engine 140, display module 150, input module 160, network 170, and database 180. Database access module 110, search engine 120, display generation module 130, calculation engine 140, display module 150, and input module 160 may represent various software components that may be executed by a computer system. For example, computer system 115 may execute each of these software components which may be part of a software product that is configured to create pivot tables. While some of these software components are illustrated as interconnected, it should be understood that in various embodiments each software component may be configured to communicate with each other software component.

Database access module 110 may serve as an interface between one or more data storage arrangements and other software components. Database access module 110 may be configured to select one or more data storage arrangements to access based on a request received from search engine 120. Database access module 110 may be configured to receive data from data storage arrangements and/or write data to such data storage arrangements. Database access module 110 may be configured to interact with databases. Database access module 110 may also be configured to interact with other forms of data storage arrangements, such as tables, text files, proprietary data formats, etc.

Search engine 120 may be configured to perform the search of one or more data storage arrangements via database access module 110. Search engine 120 may configure the search based on input received from input module 160. As an example, input may be received from a user that indicates a pivot table is to be created that represents stored records from one or more databases into two categories. The database to be used and the categories may be specified by input received from input module 160. The search may be created by search engine 120 based on such input. Search engine 120 may then use database access module 110 to access the stored records and conduct the search.

Display generation module 130 may generate the pivot table for display. Generating the pivot table for display may include generating a shell pivot table that contains various cells. Each cell may relate to a combination of the categories specified by the user. Display generation module 130 may also generate one or more graphical representations that are actively linked with stored records, wherein each graphical representation is to be displayed within at least one of the cells of the pivot table. Display generation module 130 may assign each graphical representation to the appropriate cell of the table. Display generation module 130 may generate one or more properties of each graphical representation based on the stored record the graphical representation is actively linked with. For example, the color of each graphical representation may vary based on a property of the actively linked stored record. Display generation module 130 may access calculation engine 140 to determine the dimensions of the graphical representations and/or to determine a layout of the graphical representations within each cell of the pivot table.

Calculation engine 140 may calculate a number of stacks that are to be present within each cell (that contains graphical representations) of the pivot table. Each cell that contains graphical representations of the pivot table may contain the same number of stacks. A stack may refer to a column of graphical representations. As such, if each cell of the pivot table that has graphical representations has the same number of stacks, such as two, each cell would contain two stacks of graphical representations. To calculate the number of stacks present within each cell of a pivot table, a cell width, a cell height, and a maximum record value may be used. In equation 1, $W_{px}$ represents the width of a cell in pixels; $H_{px}$ represents the height of a cell in pixels; and $Max_r$ represents the largest number of stored records that are to be represented within a single cell (for example, referring to pivot table 200 of FIG. 2, $Max_r$ would be 16 because the cell in the lower right has the largest number of graphical representations: 16). The ceiling function refers to rounding up to the nearest whole number, as having a partial stack may not be possible. Stacks refers to the resulting number of stacks. Equation 1 represents an example of an equation that may be used to determine the number of stacks that are to be present within each cell of a pivot table.

When applying equation 1 to a pivot table, each cell of the pivot table (that is to contain graphical representations) may have the same height and width.

$$\text{Stacks} = \text{ceiling}\left(\frac{W_{px}}{\sqrt{\frac{W_{px} \cdot H_{px}}{Max_r}}}\right) \quad \text{Eq. 1}$$

Other equations besides equation 1 may also be used to calculate the number of stacks that should be used for each cell. While in some embodiments the number of stacks relates to the number of columns present within each cell of a pivot table, it should be understood that the pivot table may be arranged such that each stack refers to a row of graphical elements within each cell. In such embodiments, equation 1 may be modified such that the use of the height of each cell and the width of each cell is switched.

Calculation engine 140 may additionally or alternatively perform calculations to determine the dimensions of each graphical representation present within the pivot table. All the graphical representations within the pivot table may have the same dimensions. In some embodiments, each graphical representation is a rectangle, such as a square. Calculation engine 140 may determine the dimensions of each graphical representation present within the pivot table based on the number of stacks (which may have been determined using equation 1), and the width of each cell of the pivot table that is to contain graphical representations. Another equation, such as equation 2, may be used to determine the dimensions of the graphical representations. In equation 2, $W_{gpx}$ represents the width of each graphical representation in pixels; $H_{gpx}$ represents the height of each graphical representation in pixels; stacks represents the number of stacks present in each cell of the pivot table that are to contain graphical representations.

$$W_{gpx} = H_{gpx} = \text{ceiling}\left(\frac{W_{px}}{\text{Stacks}}\right) - 1 \quad \text{Eq. 2}$$

In equation 2, since $W_{gpx}$ equals $H_{gpx}$, each graphical representation will be a square. However, it should be understood that in other embodiments other shapes may be used for each graphical representation. For example, equation 2 may only be used to determine the width of each graphical replication, with a smaller or greater value being used for the height of each graphical representation, thus resulting in each graphical representation being a rectangle. It should be understood that other shapes, symbols, or designs may be used for graphical representations.

Display module 150 may serve as an interface between the pivot table as generated by display generation module 130 and a display adapter of computer system 115. Input module 160 may serve as an interface between one or more user input devices, such as a keyboard or mouse, and the other software modules. Database access module 110 may communicate with one or more data storage arrangements via network 170. Network 170 may represent one or more public and/or private networks. For example, a public network may be the Internet; a private network may be a corporate intranet.

Database 180 represents an exemplary data storage arrangement which may be interrogated by database access module 110. Database 180 may include various stored records, which may be used to generate pivot tables. Based upon the permissions of database 180, database access module 110 may be permitted to only read stored records from database 180 or may be permitted to read and modify stored records within database 180. While system 100 contains only a single database (database 180), in other embodiments a greater number of databases or other data storage arrangements may be present. Further, while various components of the software used to create the pivot table are illustrated in system 100 as distinct, it should be understood that such components may be combined into a single grouping of code. Greater or fewer numbers of software components may be present. Computer system 115 may be operated locally or remotely from the user interacting with a pivot table. For example, computer system 115 may be a centralized server that executes enterprise resource planning software for multiple users. In other embodiments, computer system 115 may be an end user computer system that is configured to access one or more remote and/or local data storage arrangements that contain stored records to be used to create pivot tables.

Figure 2:
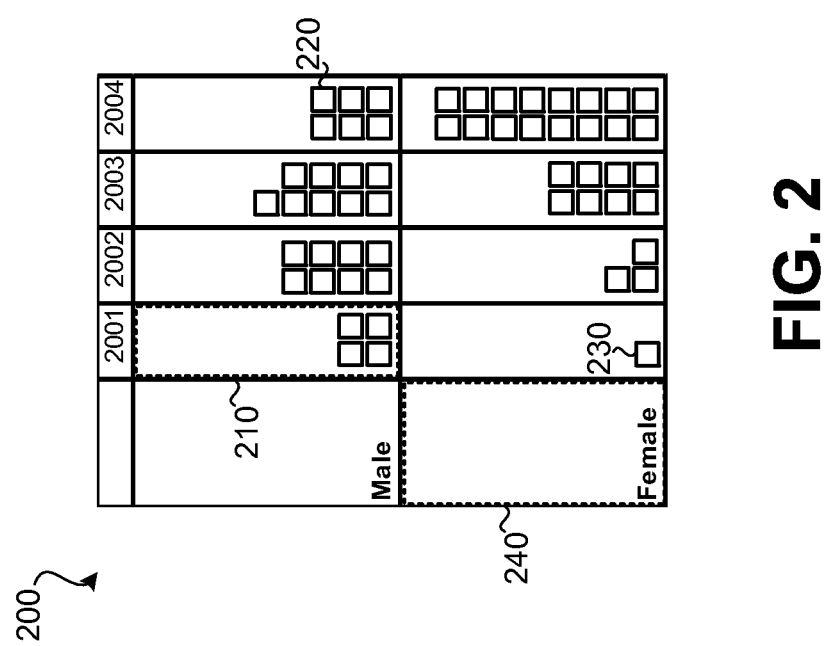
FIG. 2 illustrates an embodiment of a pivot table having graphical representations of stored data elements.

FIG. 2 illustrates an embodiment of a pivot table 200 having graphical representations of stored data elements. Pivot table 200 may have been created using system 100. Some other computerized system for creating pivot tables may also be used to create pivot table 200. More generally, a computer system may be used to generate pivot table 200.

Cell 210 represents an exemplary cell of pivot table 200. Cell 210 contains four graphical representations. Each of these graphical representations may be actively linked with a stored record, such as a stored record present within a database. Cell 210 is associated with two characteristics of pivot table 200: "male" and "2001." As such, each graphical representation within cell 210 may be actively linked with a stored record that has the property of "male" and "2001." By the graphical representations within cell 210 being actively linked with stored records, this means that each graphical representation corresponds to a specific stored record. As an example, graphical representation 220 corresponds to a specific stored record. Interaction with graphical representation 220 may result in information from the stored record being displayed and/or modified. When a user interacts with the graphical representation, such as graphical representation 220, a storage arrangement, such as the database, may be accessed to retrieve and/or modify data of the stored record that is actively linked with graphical representation 220.

In pivot table 200, each cell that contains graphical representations has the same dimensions (e.g., has the same height and width). Cells that do not contain graphical representations, such as cell 240, may vary in height and/or width from other cells. Further, the number of stacks present within each cell that contains graphical representations is constant. In pivot table 200, two stacks are present within each cell that contains graphical representations. In some instances, a cell may not have enough graphical representations to fill the number of stacks. For example, graphical representation 230 is the only graphical representation present within its cell. As such, the graphical representation may be placed in only one of the stacks. In some embodiments, graphical representation 230 may be centered. The number of graphical representations in each stack may be kept similar. For example, if two stacks are present within each cell of pivot table 200, and a cell contains an even number of graphical representations, each stack may contain the same number of graphical representations. If an odd number of graphical representations is present within a cell, one stack within the cell may contain one or more graphical representations than the other stack within the cell. Keeping the number of graphical representations present within each stack of a cell approximately the same may be useful in allowing the user to visually compare quantities of graphical representations in multiple cells with each other.

In pivot table 200, each graphical representation is a square of the same dimensions. Again, having each graphical representation have the same dimensions may allow for a user to visually compare quantities between cells efficiently. The graphical representations in each cell may be organized in the general shape of a bar. As such, each bar may have approximately the same width, but may vary in height according to the number of graphical representations present within the cell.

Figure 3A:
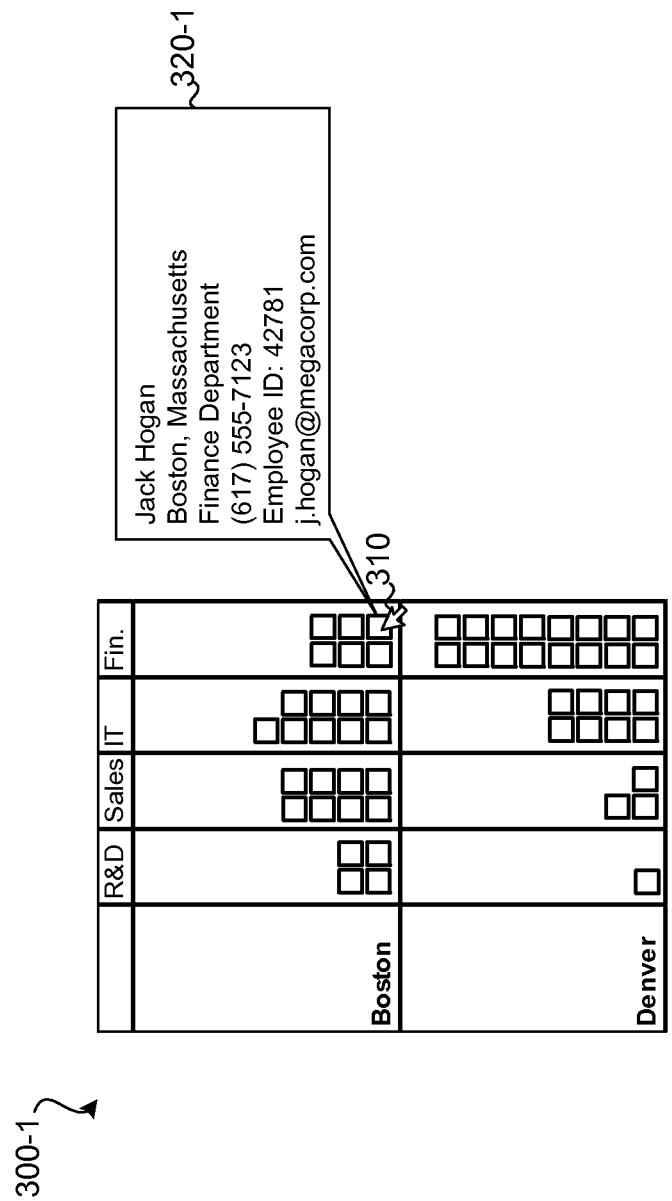
FIG. 3A illustrates an embodiment of a pivot table having a stored record displayed that is linked with a graphical representation.

FIG. 3A illustrates an embodiment of a pivot table 300-1 having a stored record displayed that is linked with a graphical representation. Pivot table 300-1 may have been created using system 100. Some other computerized system for creating pivot tables may also be used to create pivot table 300-1. More generally, a computer system may be used to generate pivot table 300-1.

In pivot table 300-1, a user may select a graphical representation. Selection for the graphical representation may occur by the user moving a cursor, such as cursor 310, over a graphical representation. In some embodiments, the user may be required to perform an additional action to select a graphical representation, such as clicking a mouse. As those with skill in the art will recognize, other forms of user input may be used to select one (or more) graphical representations.

In pivot table 300-1, a graphical representation has been selected. Since the graphical representation is actively linked with a stored record, some or all of the data of the stored record may be retrieved (from a data storage arrangement, such as a database) and presented to the user. In pivot table 300-1, display box 320-1 is presented to the user. Display box 320-1 displays a selection of information from the stored record that corresponds to the selected graphical representation. As such, the user viewing the pivot table 300-1 is able to view details regarding each stored record represented by graphical representations within pivot table 300-1. Which information from the stored record is presented when a user selects a graphical representation may be configurable. In some embodiments, all information of the stored record may be present. In the illustrated embodiment of pivot table 300-1, the display has been configured such that selected data from the stored record is presented to the user. In this embodiment the data from the stored record presented includes: a name, a home city, a corporate department, a phone number, an employee identification number, and an email address. As should be understood, this information is for example purposes only; other information may be presented in addition or instead.

If the user selects another graphical representation, which may be present in the same cell or at a different cell from the currently selected graphical representation, data from the stored record actively linked with the newly selected graphical representation may be displayed. This data may be presented instead of or in addition to the data presented in display box 320-1. In some embodiments, it may be possible for a user to select multiple graphical representations at the same time, which may result in data from the actively linked stored records being presented concurrently.

In some embodiments, display box 320-1 may be used to modify the stored record. As such, a user may select a graphical representation, which may trigger display box 320-1 to be presented to the user. If permissible (such as, based on security permissions) the user may be able to directly edit data present within display box 320-1. If impermissible, the user may be prevented from editing such data.

While the illustrated embodiment of pivot table 300-1 illustrates the use of display box 320-1, other presentation means may be used to display information from a stored record. For example, such information from a stored record may be presented in a separate window from pivot table 300-1. In some embodiments, a portion of the screen may be reserved as a detail display region, in which information from stored records may be presented. How such information is presented from a stored record may be customized by the user.

Figure 3B:
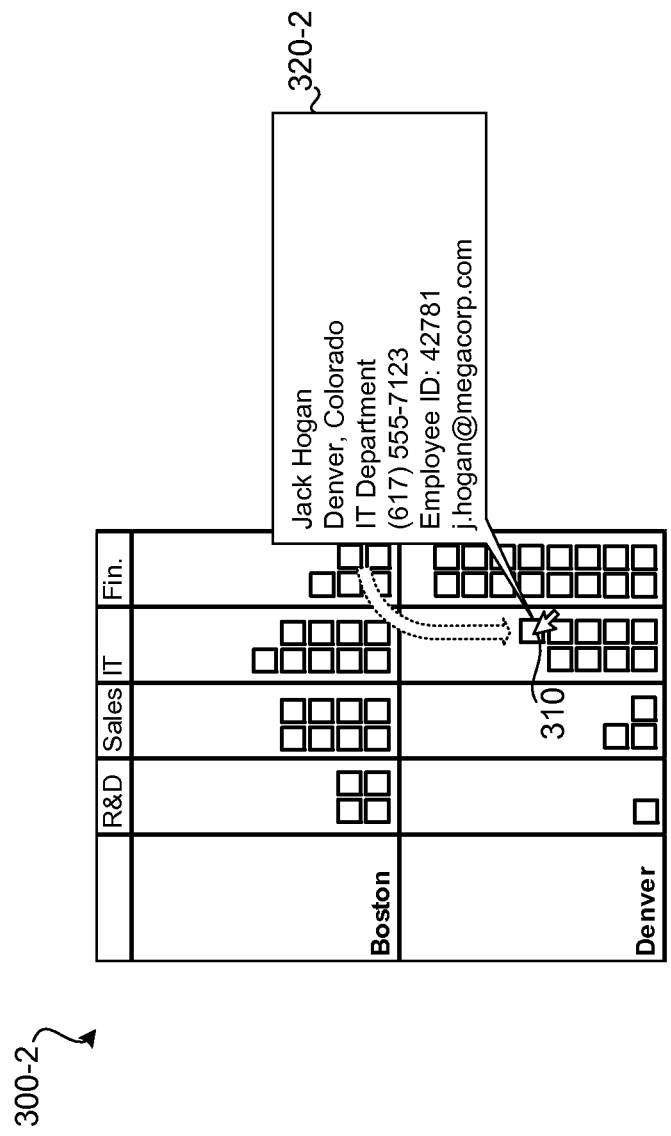
FIG. 3B illustrates an embodiment of a pivot table being used to modify a stored record.

FIG. 3B illustrates an embodiment of a pivot table being used to modify a stored record. Pivot table 300-2 may have been created using system 100. Some other computerized system for creating pivot tables may also be used to create pivot table 300-2. More generally, a computer system may be used to generate pivot table 300-2. Pivot table 300-2 may represent a modified embodiment of pivot table 300-1 of FIG. 3A.

In pivot table 300-2, a user may be manipulating graphical representations that are actively linked with stored records to modify such stored records. The graphical representation that was selected in pivot table 300-1 of FIG. 3A, has been moved in pivot table 300-2 of FIG. 3B, as represented by the (imaginary) dotted arrow. As such, a user selected the graphical representation and may have dragged it to a different cell. While the cell where the graphical representation originated has the characteristics of finance ("Fin.") and "Boston," the destination cell has the characteristics of "IT" and "Denver." Since the user has indicated that the graphical representation is to be moved to the destination cell, the stored record actively linked with the graphical representation may be modified to match the properties of the destination cell that are different from the stored record. As such, within the stored record, the department may be modified from finance to IT, and the home city may be modified from Boston, Mass. to Denver, Colo. Other portions of the stored record may remain unchanged.

Display box 320-2 represents the modified stored record that is linked with the graphical representation that the user moved. As compared with the display box 320-1 of FIG. 3A, the modified home city and department is evident. Such moving of graphical representations may only be permitted if the user has access to modify the stored records that are actively linked with the graphical representations. Other forms of modification besides moving from a graphical representation from one cell of the pivot table 300-2 to another cell of pivot table 300-2 may be permitted. For instance, a user may select a graphical representation and delete it. As another example, a user may copy and paste a graphical representation. Such manipulation of graphical representations may result in similar modification of stored records. As such, if the graphical representation is deleted, the corresponding stored record may also be deleted. Copying and pasting a graphical representation may result in an additional stored record being generated that is associated with the pasted graphical representation.

Figure 4:
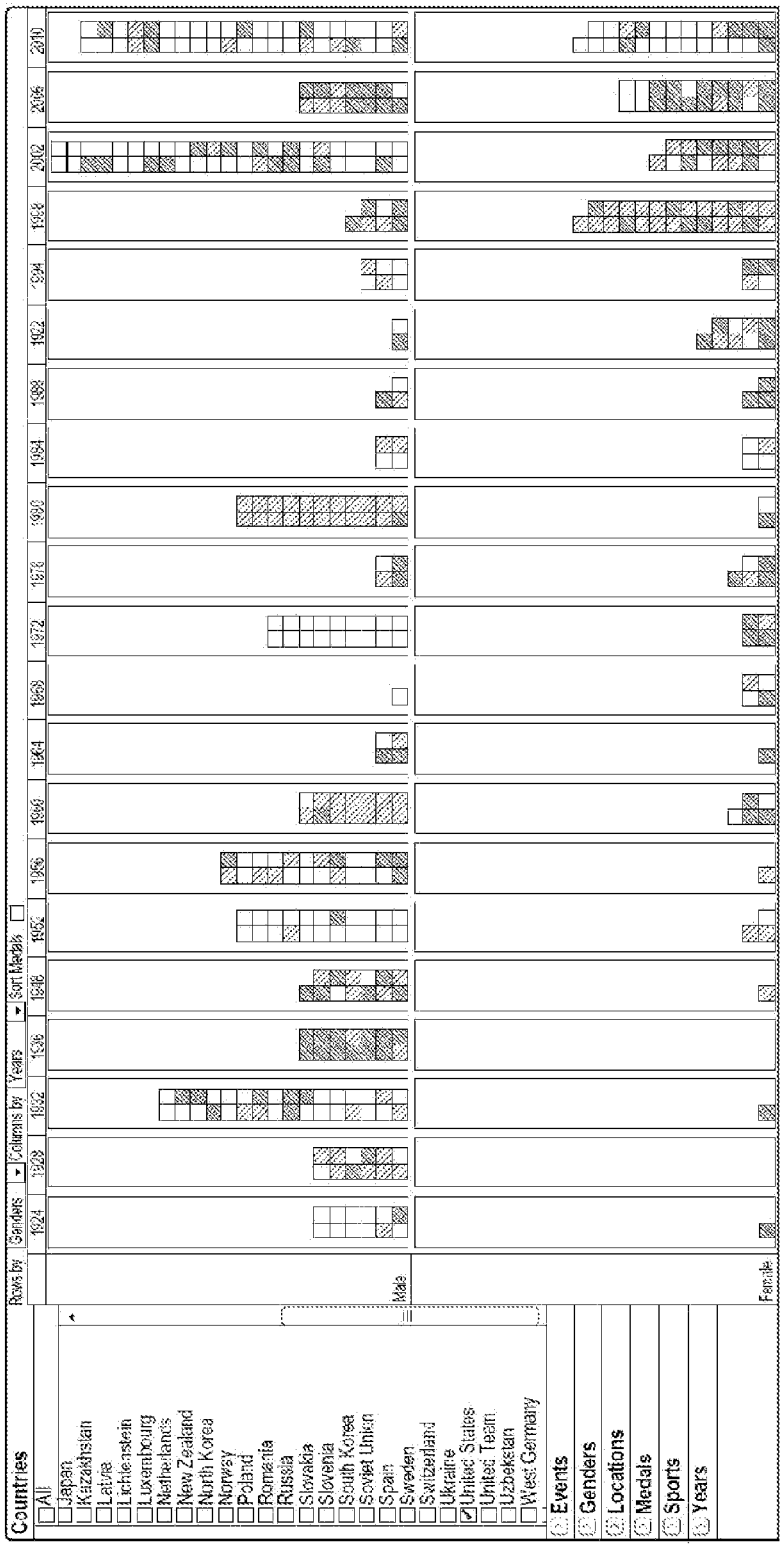
FIG. 4 illustrates an embodiment of a pivot table having colored graphical representations of stored data elements.

FIG. 4 illustrates an embodiment of a pivot table 400 having colored graphical representations of stored data elements. Pivot table 400 may have been created using system 100. Some other computerized system for creating pivot tables may also be used to create pivot table 400. More generally, a computer system may be used to generate pivot table 400. Pivot table 400 represents a pivot table with a greater number of cells than pivot tables 200, 300-1, or 300-2. Similar to the previously detailed pivot tables, each cell is associated with various combinations of stored record characteristics: in FIG. 4, the characteristics are gender and year.

To represent colors in FIG. 4, stripes and dotted patterns are used. This is for illustration purposes only, multiple colors may be used in such a pivot table. In pivot table 400, each cell containing graphical representations may have the same dimensions. Each graphical representation may also have the same dimensions. Each cell has the same number of stacks (in this case, two). The graphical dimensions present in each cell of pivot table 400 are arranged into bars, with each stack of the same cell having approximately the same number of graphical representations (no more than one additional graphical representation in a stack than the other stack of the same cell). Some cells may have no graphical representations of stored records present.

Figure 5:
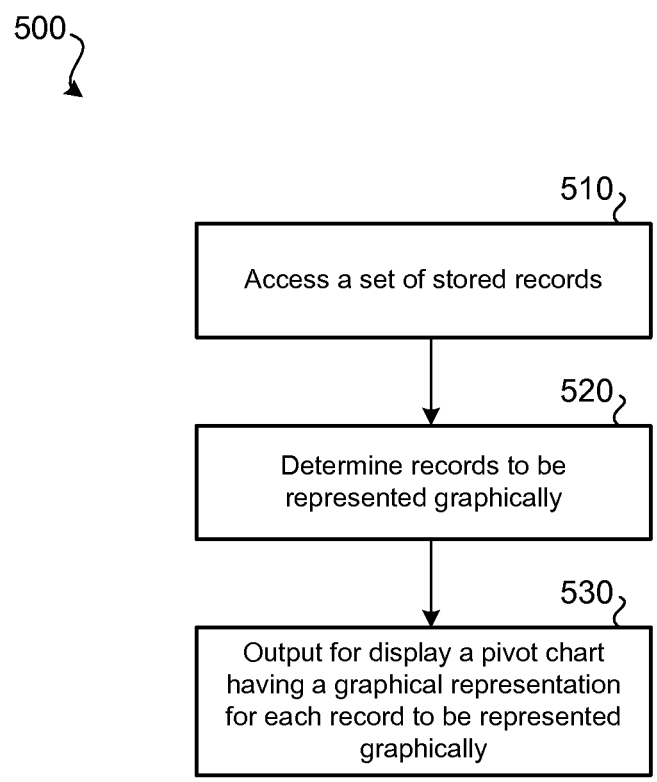
FIG. 5 illustrates an embodiment of a method for creating a pivot table having graphical representations of stored data elements.

FIG. 5 illustrates an embodiment of a method for creating a pivot table having graphical representations of stored data elements. Method 500 may be performed using system 100 of FIG. 1. Some other system that is configured to create pivot tables may also be used to perform method 500. Generally, each step of method 500 may be performed by a computer system, such as computer system 900 of FIG. 9.

At step 510, a set of stored records may be accessed. This may involve one or more remote and/or local databases or other storage arrangements that may be accessed such that the records contained therein may be used to create a pivot table. Some or all of the stored records accessed may be used to construct a pivot table.

At step 520, it may be determined which records from the stored set of records are to be represented graphically. Representing a stored record graphically may involve displaying a graphical representation for the stored record. As such, each stored record that is determined to be represented may have an actively linked graphical representation generated. Which records are to be represented graphically may be based on the content of each stored record and the characteristics that are to be used for the pivot table. For example, a characteristic may be assigned to the rows and a second characteristic may be assigned to the columns. For example, referring to pivot table 400 of FIG. 4, the columns are associated with years, while the rows are associated with gender. The characteristics to be used may be based on received user input.

At step 530, a pivot table may be generated and a graphical representation for each record to be represented in the pivot table may be generated. The pivot table may contain multiple cells. Each cell that is configured to display graphical representations may have the same dimensions. Each graphical representation may have the same dimensions. The graphical representations may be arranged within each cell to represent a bar. As such, each graphical representation in the pivot table may represent a specific stored record. Each graphical representation may be actively linked with its corresponding stored record such that if the graphical representation is selected, data from the stored record may be displayed and/or modified.

Figure 6:
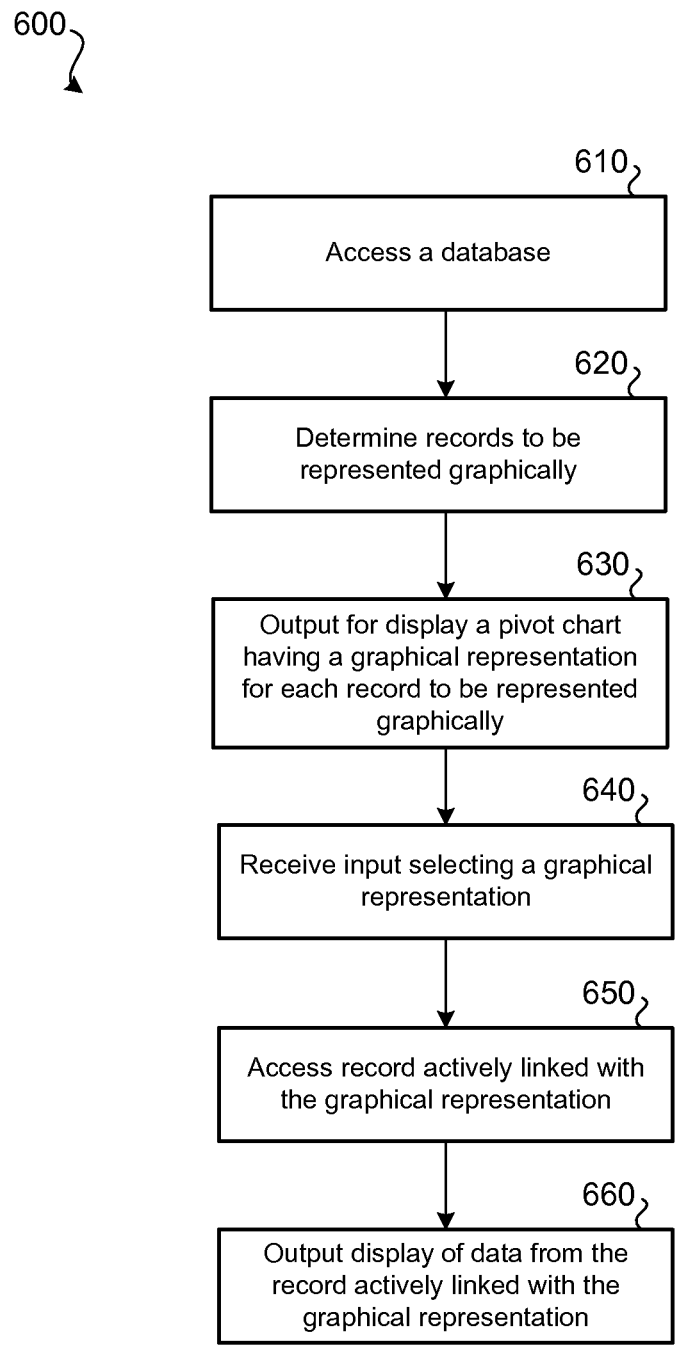
FIG. 6 illustrates an embodiment of a method for creating a pivot table having graphical representations of stored records and accessing an associated stored record.

FIG. 6 illustrates an embodiment of a method for creating a pivot table having graphical representations of stored records and accessing an associated stored record. Method 600 may be performed using system 100 of FIG. 1. Some other system that is configured to create pivot tables may also be used to perform method 600. Generally, each step of method 600 may be performed by a computer system, such as computer system 900 of FIG. 9. Method 600 may represent a more detailed embodiment of method 500.

At step 610, stored records of one or more databases may be accessed. This may involve one or more remote and/or local databases. In addition to (or instead of) databases, other storage arrangements may be accessed for stored records.

At step 620, it may be determined which records of the database(s) accessed at step 610 are to be represented graphically. Representing a stored record graphically may involve displaying a graphical representation that is actively linked with the stored record. As such, each stored record that is determined to be represented may have an associated graphical representation. Which records are to be represented graphically may be based on the content of each stored record, and the characteristics that are to be used for the pivot table. For example, a characteristic may be assigned to the rows and a second characteristic may be assigned to the columns. The characteristics to be used may be based on received user input.

At step 630, a pivot table may be generated and a graphical representation for each record to be represented in the pivot table may be generated and output for display. The pivot table may contain multiple cells. Each cell that is configured to display graphical representations may have the same dimensions. Each graphical representation may have the same dimensions. Graphical representations may be placed in a cell that corresponds to the characteristics of the stored record linked with the graphical representation. The graphical representations may be arranged within each cell to represent a bar.

At step 640, input may be received that selects a graphical representation. This input may be received from a user. For example, the input may be in the form of a cursor, which may be controlled by a mouse being moved over one of the graphical representations. In some embodiments, a user may use a cursor to click on a graphical representation. Other forms of input may be used to select a graphical representation. In some embodiments, multiple graphical representations may be selected at the same time.

At step 650, a stored record that is actively linked with the graphical representation selected at step 640 may be accessed. In some embodiments, the accessing of the stored record may be performed locally (e.g., locally by the computer system performing method 600). In such embodiments, the database containing the record may be stored locally. In some embodiments, if the database is remote, the stored record may already have been retrieved at step 610 or step 620. Accessing the stored record may involve retrieving some or all of the data of the stored record. If the user has selected multiple graphical representations, stored records linked with the additional graphical representations may be retrieved.

At step 660, the data of the stored record that was retrieved at step 650 may be outputted for display. For example, referring to FIG. 3A, a display box, such as display box 320-1, may be generated that serves to display data of the stored record associated with the graphical representation. If the user has selected multiple graphical representations, the data associated with the additional stored records may be output for display. Outputting for display may involve transmitting data to a display device, such as a computer screen, for display to a user.

Figure 7:
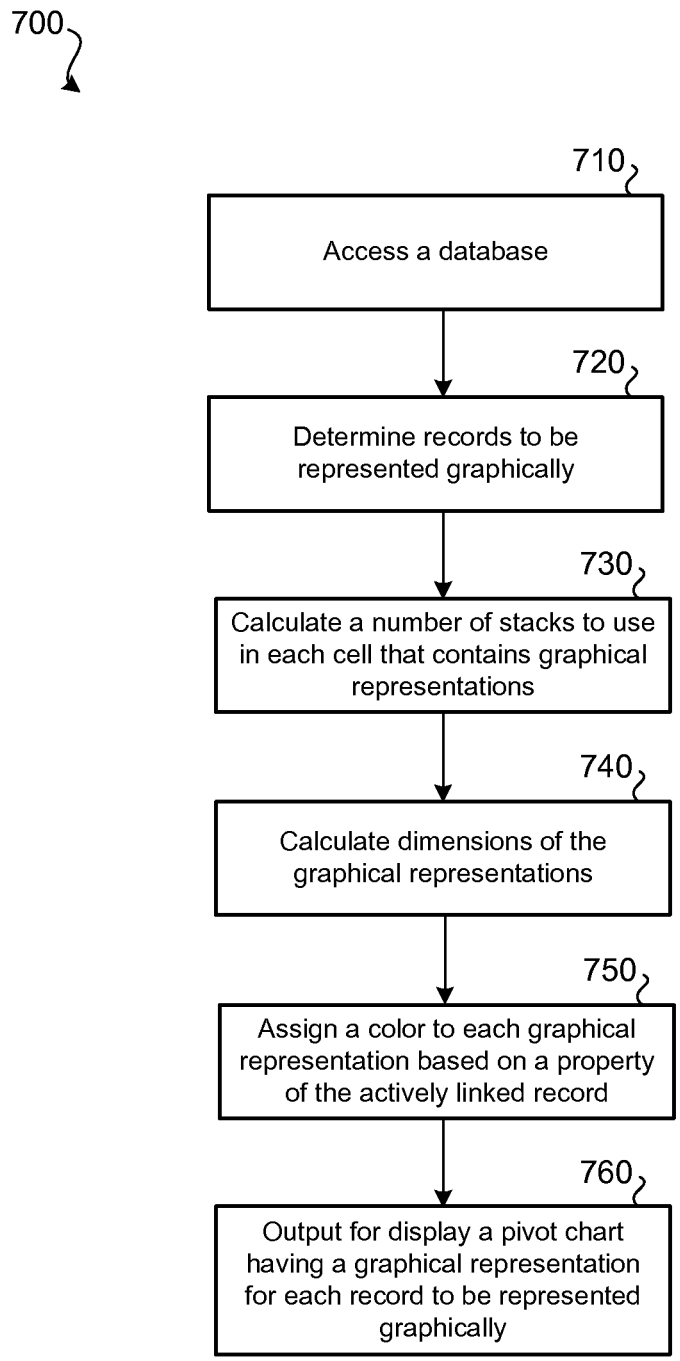
FIG. 7 illustrates another embodiment of a method for creating a pivot table having graphical representations of stored records.

FIG. 7 illustrates another embodiment of a method for creating a pivot table having graphical representations of stored records. Method 700 may be performed using system 100 of FIG. 1. Some other system that is configured to create pivot tables may also be used to perform method 700. Generally, each step of method 700 may be performed by a computer system, such as computer system 900 of FIG. 9. Method 700 may represent a more detailed embodiment of method 500. Method 700 may also be part of method 600.

At step 710, stored records of one or more databases may be accessed. This may involve one or more remote and/or local databases. In addition to (or instead of) databases, other storage arrangements may be accessed for stored records.

At step 720, it may be determined which records of the database(s) accessed at step 710 are to be represented graphically. Representing a stored record graphically may involve displaying a graphical representation that is actively linked with the stored record. As such, each stored record that is determined to be represented may have an associated graphical representation. Which records are to be represented graphically may be based on the content of each stored record and the characteristics that are to be used for the pivot table. For example, a characteristic may be assigned to the rows and a second characteristic may be assigned to the columns. The characteristics to be used may be based on received user input.

At step 730, a number of stacks of graphical representations to use in each cell that is to contain graphical representations in the pivot table is calculated. Calculating the number of stacks may involve use of an equation such as previously detailed equation 1. Each cell that is to contain graphical representations may have the same number of stacks. Further, each cell that is to contain graphical representations may have the same dimensions (e.g., the same height and width).

At step 740, the dimensions (e.g., height and width) of each graphical representation of the pivot table may be calculated. Calculating the dimensions of the graphical representations may involve the use of an equation, such as previously detailed equation 2. In some embodiments, the height and width of each graphical representation may be the same, thus making each graphical representation a square. In some embodiments, other shapes may be used, such as a rectangle. The graphical representations may not be alphanumeric characters. In the previously described methods (500 and 600), generating the pivot table and graphical representations may include performing steps 730 and 740.

At step 750, a color may be assigned to each graphical representation. The color may be based on a characteristic of the stored record associated with the graphical representation. The colors used and the characteristic(s) upon which the colors are based may be based upon user input. For example, a user may select a characteristic present within each stored record upon which color is based. The user may further specify the color assigned to each possible value of the characteristic. For example, if the characteristic is a home city, Boston may be assigned blue, New York may be assigned red, San Francisco may be assigned green, and all other cities may be assigned gray.

At step 760, a pivot table may be generated and a graphical representation for each record to be represented in the pivot table may be generated in accordance with the calculations and colors of steps 730 through 750. The pivot table containing the graphical representations may be output for display. The pivot table may contain multiple cells. Each cell that is configured to display graphical representations may have the same dimensions. Each graphical representation may have the same dimensions. The graphical representations may be arranged within each cell to represent a bar. As such, each graphical representation in the pivot table may represent a specific stored record. Each graphical representation may be actively linked with its corresponding stored record such that if the graphical representation is selected, data from the stored record may be displayed and/or modified.

Figure 8:
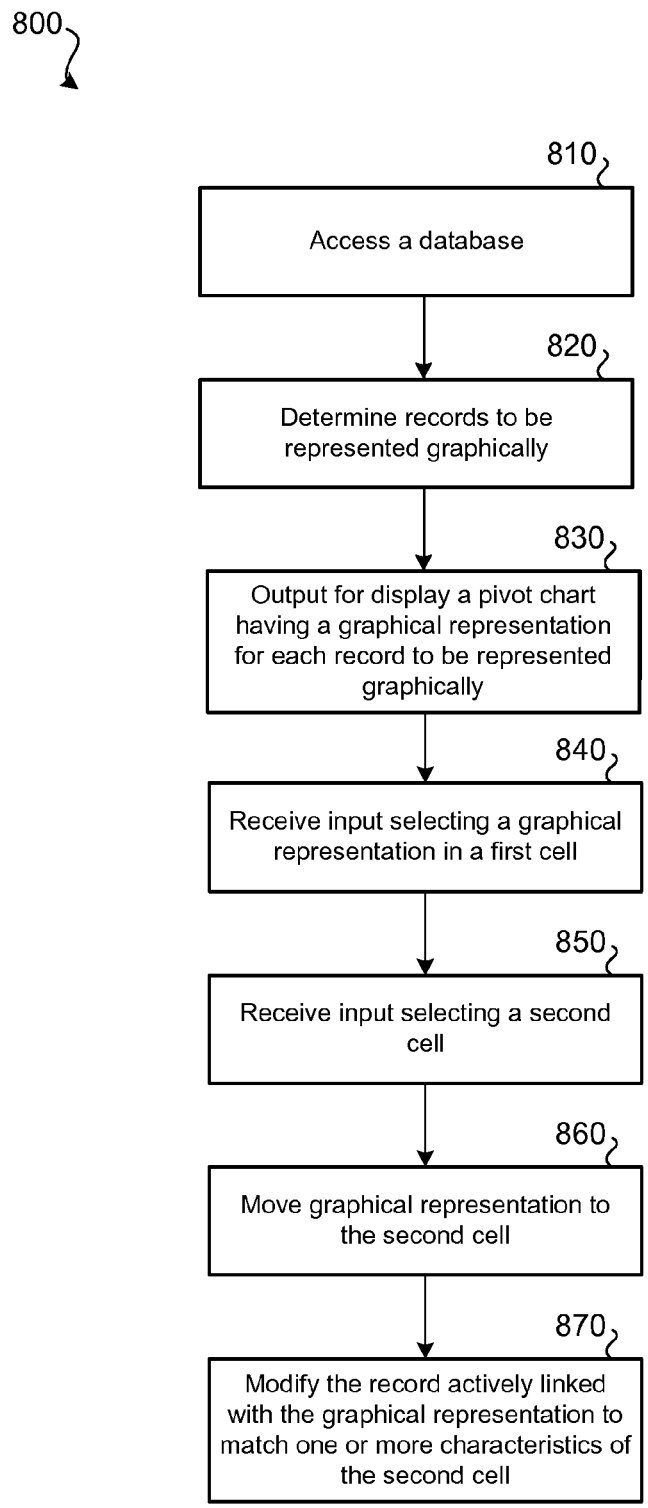
FIG. 8 illustrates an embodiment of a method for creating a pivot table and modifying a stored record.

FIG. 8 illustrates an embodiment of a method for creating a pivot table and modifying a stored record. Method 800 may be performed using system 100 of FIG. 1. Some other system that is configured to create pivot tables may also be used to perform method 800. Generally, each step of method 800 may be performed by a computer system, such as computer system 900 of FIG. 9. Method 800 may represent a more detailed embodiment of method 500. Method 800 may also be part of method 600 and/or method 700.

At step 810, stored records of one or more databases may be accessed. This may involve one or more remote and/or local databases. In addition to (or instead of) databases, other storage arrangements may be accessed for stored records.

At step 820, it may be determined which records of the database(s) accessed at step 810 are to be represented graphically. Representing a stored record graphically may involve displaying a graphical representation that is actively linked with the stored record. As such, each stored record that is determined to be represented may have an associated graphical representation. Which records are to be represented graphically may be based on the content of each stored record and the characteristics that are to be used for the pivot table. For example, a characteristic may be assigned to the rows and a second characteristic may be assigned to the columns. The characteristics to be used may be based on received user input.

At step 830, a pivot table may be generated and a graphical representation for each record to be represented in the pivot table may be generated and output for display. The pivot table may contain multiple cells. Each cell that is configured to display graphical representations may have the same dimensions. Each graphical representation may have the same dimensions. Graphical representations may be placed in a cell that corresponds to the characteristics of the stored record linked with the graphical representation. The graphical representations may be arranged within each cell to represent a bar.

At step 840, input may be received that selects a graphical representation within a first cell. This input may be received from a user. For example, the input may be in the form of a cursor, which may be controlled by a mouse being moved over one of the graphical representations. In some embodiments, a user may use a cursor to click on a graphical representation. Other forms of input may be used to select a graphical representation. In some embodiments, multiple graphical representations may be selected at the same time.

At step 850, input may be received that selects a second cell. The user may use a cursor to click on a second cell. Other forms of input may be used to select a second cell. For example, the graphical representation from the first cell may be dragged into the second cell.

At step 860, in response to the input received at step 840 and step 850, the graphical representation may be moved from the first cell to the second cell. This may only occur if the user has permission to move graphical representations and/or modify stored records. As such, the graphical representation may no longer be present in the first cell and may be added to the second cell. The stacks per cell and dimensions of a graphical representation may be recalculated based on the move. For example, if the move affects $Max_r$ of equation 1, the number of stacks per cell and/or the dimensions of graphical representations may change.

At step 870, in response to the input received at step 840 and step 850, the stored record that is actively linked with the graphical representation that was moved may be modified. The modification may result in the stored record matching one or more characteristics of the second cell. For example, referring to the move of FIGS. 3A and 3B, moving the graphical representation from a cell having the characteristics of Finance and Boston to a cell having the characteristics of IT and Denver results in the stored record associated with the graphical representation being modified to indicate IT and Denver, Colo.

While method 800 focuses on a graphical representation being moved, a similar method may be used for copying and pasting. However, rather than moving the graphical representation, the graphical representation may be added to the second cell. A corresponding stored record may be created based on the characteristics of the second cell and the original stored record. For a method that deletes a graphical representation, the actively linked stored record may be deleted.

Figure 9:
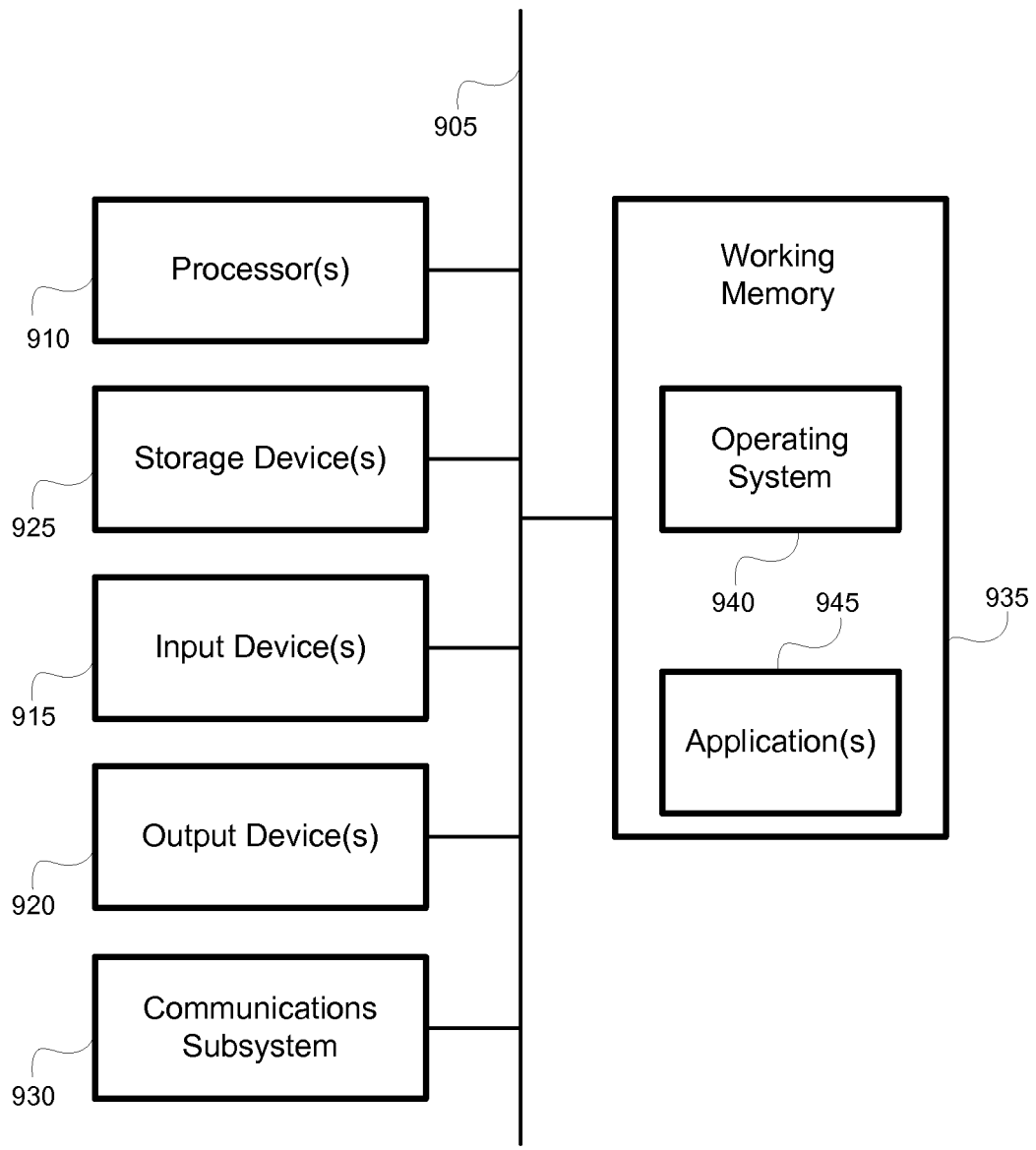
FIG. 9 illustrates an embodiment of a computer system.

FIG. 9 illustrates an embodiment of a computer system. A computer system as illustrated in FIG. 9 may be incorporated as part of the previously described computerized devices. For example, computer system 900 can represent computer system 115. FIG. 9 provides a schematic illustration of one embodiment of a computer system 900 that can perform the methods described herein. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner.

The computer system 900 is shown comprising hardware elements that can be electrically coupled via a bus 905 (or may otherwise be in communication, as appropriate). The hardware elements may include one or more processors 910, including without limitation one or more general-purpose processors and/or one or more special-purpose processors (such as digital signal processing chips, graphics acceleration processors, and/or the like); one or more input devices 915, which can include without limitation a mouse, a keyboard, and/or the like; and one or more output devices 920, which can include without limitation a display device, a printer, and/or the like.

The computer system 900 may further include (and/or be in communication with) one or more non-transitory storage devices 925, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 900 might also include a communications subsystem 930, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 930 may permit data to be exchanged with a network (such as the network described below, to name one example), other computer systems, and/or any other devices described herein. In many embodiments, the computer system 900 will further comprise a working memory 935, which can include a RAM or ROM device, as described above.

The computer system 900 also can comprise software elements, shown as being currently located within the working memory 935, including an operating system 940, device drivers, executable libraries, and/or other code, such as one or more application programs 945, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 925 described above. In some cases, the storage medium might be incorporated within a computer system, such as computer system 900. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 900) to perform methods in accordance with various embodiments of the invention. According to a set of embodiments, some or all of the procedures of such methods are performed by the computer system 900 in response to processor 910 executing one or more sequences of one or more instructions (which might be incorporated into the operating system 940 and/or other code, such as an application program 945) contained in the working memory 935. Such instructions may be read into the working memory 935 from another computer-readable medium, such as one or more of the storage device(s) 925. Merely by way of example, execution of the sequences of instructions contained in the working memory 935 might cause the processor(s) 910 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 900, various computer-readable media might be involved in providing instructions/code to processor(s) 910 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 925. Volatile media include, without limitation, dynamic memory, such as the working memory 935.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 900.

The communications subsystem 930 (and/or components thereof) generally will receive signals, and the bus 905 then might carry the signals (and/or the data, instructions, etc. carried by the signals) to the working memory 935, from which the processor(s) 910 retrieves and executes the instructions. The instructions received by the working memory 935 may optionally be stored on a storage device 925 either before or after execution by the processor(s) 910.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for creating a pivot table, the method comprising:
    accessing, by a computer system, a set of stored records;
    receiving a first characteristic and a second characteristic associated with the set of stored records, to be used to generate a pivot table including a plurality of cells, wherein each row of the pivot table is associated with a different value of the first characteristic and each column of the pivot table is associated with a different value of the second characteristic such that each cell of the plurality of cells is associated with a different combination of values of the first characteristic and the second characteristic;
    determining, by the computer system, a plurality of stored records from the set of stored records wherein each stored record of the plurality of stored records includes a combination of values of the first characteristic and the second characteristic; and
    generating, by the computer system, for display, the pivot table that comprises a graphical representation for each stored record of the plurality of stored records, wherein each graphical representation is non-alphanumeric, and wherein for each stored record of the plurality of stored records
        a graphical representation is generated for display within one cell of the plurality of cells of the pivot table based on the combination of values of the first characteristic and the second characteristic included in the stored record, wherein each cell of the plurality of cells is configured to display a plurality of graphical representations corresponding to a subset of the plurality of stored records, and
        the graphical representation is actively linked with the corresponding stored record so that a modification made in the graphical representation is reflected in the corresponding stored record
    calculating, by the computer system, a number of stacks for use in each cell that comprises graphical representations,
    wherein calculating the number of stacks for use in each cell of the pivot table that comprises graphical representations comprises:
        determining, by the computer system, a maximum number of graphical representations to be displayed in a single cell of the plurality of cells of the pivot table;
        determining, by the computer system, a cell height and a cell width of the each cell of the plurality of cells; and
        calculating, by the computer system, the number of stacks for use in each cell of the pivot table using the cell height, the cell width, and the maximum number of graphical representations in the single cell.

2. The method for creating the pivot table of claim 1, the method further comprising:
    receiving, by the computer system, input selecting a graphical representation displayed within the pivot table;
    accessing, by the computer system, the stored record that is actively linked to the graphical representation; and
    outputting, by the computer system, for display, data from the stored record.

3. The method for creating the pivot table of claim 1, wherein each cell of the pivot table that comprises graphical representations has a same number of stacks.

4. The method for creating the pivot table of claim 3, further comprising:
calculating, by the computer system, dimensions of each graphical representation using the cell width and the number of stacks, wherein each graphical representation of the pivot table has the dimensions.

5. The method for creating the pivot table of claim 1, the method further comprising:
arranging, by the computer system, graphical representations within at least one cell of the plurality of cells such that the at least one cell displays a graphical bar comprising the cell's graphical representations.

6. The method for creating the pivot table of claim 1, the method further comprising:
assigning, by the computer system, a color to each graphical representation based on a property of the stored record that is actively linked to the graphical representation, wherein:
generating for display the graphical representation for each stored record comprises using the assigned color.

7. The method for creating the pivot table of claim 1, the method further comprising:
receiving, by the computer system, input selecting a selected graphical representation displayed within the pivot table, wherein the selected graphical representation is within a first cell of the plurality of cells of the pivot table;
receiving, by the computer system, input selecting a second cell of the plurality of cells;
moving, by the computer system, the selected graphical representation from the first cell of the pivot table to the second cell of the pivot table; and
modifying, by the computer system, the stored record actively linked to the selected graphical representation such that the stored record matches one or more characteristics of the second cell.

8. The method for creating the pivot table of claim 7, wherein:
receiving input selecting the selected graphical representation displayed within the pivot table and receiving input selecting the second cell of the plurality of cells comprises:
receiving, by the computer system, input dragging the selected graphical representation from the first cell to the second cell.

9. A computer program product residing on a non-transitory processor-readable medium for creating a pivot table, the computer program product comprising computer-readable instructions configured to cause a computer to:
access a set of stored records;
receive a first characteristic and a second characteristic associated with the set of stored records, to be used to generate a pivot table including a plurality of cells, wherein each row of the pivot table is associated with a different value of the first characteristic and each column of the pivot table is associated with a different value of the second characteristic such that each cell of the plurality of cells is associated with a different combination of values of the first characteristic and the second characteristic;
determine a plurality of stored records from the set of stored records wherein each stored record of the plurality of stored records includes a combination of values of the first characteristic and the second characteristic;
generate for display, the pivot table that comprises a graphical representation for each stored record of the plurality of stored records, wherein each graphical representation is non-alphanumeric, and wherein for each stored record of the plurality of stored records
a graphical representation is generated for display within one cell of the plurality of cells of the pivot table based on the combination of values of the first characteristic and the second characteristic included in the stored record, wherein each cell of the plurality of cells is configured to display a plurality of graphical representations corresponding to a subset of the plurality of stored records, and
the graphical representation is actively linked with the corresponding stored record so that a modification made in the graphical representation is reflected in the corresponding stored record;
receive input selecting a graphical representation displayed within the pivot table;
access the stored record that is actively linked to the graphical representation; and
output for display data of the stored record,
calculate a number of stacks for use in each cell that comprises graphical representations,
wherein the computer-readable instructions configured to cause the computer to calculate the number of stacks for use in each cell of the pivot table that comprises graphical representations comprise computer-readable instructions configured to cause the computer to:
determine a maximum number of graphical representations to be displayed in a single cell of the plurality of cells of the pivot table;
determine a cell height and a cell width of each cell of the plurality of cells; and
calculate the number of stacks for use in each cell of the pivot table using the cell height, the cell width, and the maximum number of graphical representations in the single cell.

10. The computer program product of claim 9, wherein the computer program product further comprises computer-readable instructions configured to cause the computer to:
calculate dimensions of each graphical representation using the cell width and the number of stacks, wherein each graphical representation in the pivot table has the dimensions.

11. The computer program product of claim 9, wherein the computer program product further comprises computer-readable instructions configured to cause the computer to:
arrange graphical representations within at least one cell of the plurality of cells such that the at least one cell displays a graphical bar comprising the cell's graphical representations.

12. The computer program product of claim 9, wherein the computer program product further comprises computer-readable instructions configured to cause the computer to:
assign a color to each graphical representation based on a property of the stored record that is actively linked to the graphical representation, wherein
the computer-readable instructions configured to cause the computer to generate for display the graphical representation for each stored record comprise computer-readable instructions to cause the computer to use the assigned color.

13. The computer program product of claim 9, wherein the computer program product further comprises computer-readable instructions configured to cause the computer to:
- receive input selecting a second cell of the plurality of cells, wherein the graphical representation is located in a first cell of the pivot table;
- move the graphical representation from the first cell of the pivot table to the second cell of the pivot table; and
- modify the stored record actively linked to the graphical representation such that the stored record matches one or more characteristics of the second cell.

14. The computer program product of claim 9, wherein the computer program product further comprises computer-readable instructions configured to cause the computer to:
- receive input that indicates to delete the graphical representation;
- delete the graphical representation from the pivot table; and
- delete the stored record actively linked with the graphical representation.

15. A system for creating a pivot table, the system comprising:
- a computer system, comprising:
  - a processor; and
  - a memory communicatively coupled with and readable by the processor and having stored therein processor-readable instructions which, when executed by the processor, cause the processor to:
    - access a set of stored records;
    - receive a first characteristic and a second characteristic associated with the set of stored records, to be used to generate a pivot table including a plurality of cells, wherein each row of the pivot table is associated with a different value of the first characteristic and each column of the pivot table is associated with a different value of the second characteristic such that each cell of the plurality of cells is associated with a different combination of values of the first characteristic and the second characteristic;
    - determine a plurality of stored records from the set of stored records wherein each stored record of the plurality of stored records includes a combination of values of the first characteristic and the second characteristic;
    - determine a maximum number of graphical representations to be displayed in a single cell of the plurality of cells of the pivot table;
    - determine a cell height and a cell width of the each cell of the plurality of cells;
    - calculate a number of stacks for use in each cell of the pivot table using the cell height, the cell width, and the maximum number of graphical representations in the single cell;
    - calculate dimensions of each graphical representation using the cell width and the number of stacks, wherein each graphical representation for each stored record has the dimensions;
    - generate for display, the pivot table that comprises a graphical representation for each stored record of the plurality of stored records, wherein each graphical representation is non-alphanumeric, and wherein for each stored record of the plurality of stored records
      - a graphical representation is generated for display within one cell of the plurality of cells of the pivot table based on the combination of values of the first characteristic and the second characteristic included in the stored record, wherein each cell of the plurality of cells is configured to display a plurality of graphical representations corresponding to a subset of the plurality of stored records, and
      - the graphical representation is actively linked with the corresponding stored record so that a modification made in the graphical representation is reflected in the corresponding stored record;
    - receive input selecting the graphical representation displayed within the pivot table;
    - access the stored record that is actively linked to the graphical representation; and
    - output for display data from the stored record.

16. The system of claim 15, wherein the processor-readable instructions further comprise processor-readable instructions, which when executed by the processor, cause the processor to:
- assign a color to each graphical representation of the pivot table based on a property of the stored record that is actively linked to the graphical representation.

* * * * *